United States Patent [19]

Olson

[11] 4,198,453

[45] Apr. 15, 1980

[54] WEATHER SEAL AND METHOD OF MAKING SAME

[75] Inventor: Harold G. Olson, Westpont, Conn.

[73] Assignee: Amesbury Industries, Inc., Amesbury, Mass.

[21] Appl. No.: 14,371

[22] Filed: Feb. 23, 1979

[51] Int. Cl.[2] .......................... B32B 5/00; E06B 7/16

[52] U.S. Cl. .......................... 428/85; 49/489; 49/493; 156/72; 156/199; 156/202; 156/204; 428/95; 428/358

[58] Field of Search .......................... 428/85, 88, 92, 95, 428/358; 49/475, 489, 493, 494; 156/72, 199, 202, 204

[56] References Cited

U.S. PATENT DOCUMENTS

| | | | |
|---|---|---|---|
| 3,175,256 | 3/1965 | Horton | 428/85 |
| 3,404,487 | 10/1968 | Johnson | 156/72 |
| 3,745,053 | 7/1973 | Johnson | 428/85 |
| 3,935,043 | 1/1976 | Kessler | 428/85 |
| 4,057,668 | 11/1977 | Metzler | 428/85 |

*Primary Examiner*—Marion E. McCamish

*Attorney, Agent, or Firm*—Cesari and McKenna

[57] ABSTRACT

Standard weather stripping composed of a backing strip and a pile body projecting from one face of the backing strip is guided into a channel having a pair of spaced apart side walls and a bottom wall. Also guided into that channel and positioned against the side of the pile body is an impervious resilient film barrier which extends from the top of the pile body down to the base thereof and across the adjacent side edge margin of the backing strip. The channel side walls are clinched against the bottom wall thereby capturing the weather stripping between those walls and bending the film barrier adjacent the base of the pile body so that the resiliency of the barrier tends to bias the portion of the barrier projecting out of the channel against the pile body so that it remains in an erect position and prevents moisture and drafts from penetrating into the pile body.

6 Claims, 2 Drawing Figures

WEATHER SEAL AND METHOD OF MAKING SAME

This invention relates to a weather seal. It relates more particularly to an improved weather strip and method of making same.

BACKGROUND OF THE INVENTION

The weather seal of the type of interest here is used around windows, doors and other closures to exclude moisture and drafts and generally to conserve energy. A weather seal includes a backing strip to which is secured a raised pile body composed of a multiplicity of closely packed fibers. The backing strip is normally inserted into a channel secured to structure adjacent to the closure so that the pile fibers engage the window or door. The weather seal thus bridges the gap between the fixed structure and the closure, yet permits the closure to move as it is being opened and closed.

Some pile weather stripping also includes a raised fin made of plastic or other impervious material which projects up from the backing strip adjacent to and on the weather side of the pile body to prevent moisture and drafts from penetrating into the pile body and causing the build-up of mold and mildew therein. One such weather stripping of this type is disclosed in U.S. Pat. No. 3,404,487 owned by the assignee of the present application. The present weather seal is of that general type.

Prior weather strips of the fin type are disadvantaged in that it is relatively difficult to form the raised fin as an extrusion at one side of the pile body as described in the aforesaid patent. Consequently, those weather strips tend to be relatively expensive.

It would be advantageous to form the fin using a plastic film attached to the backing strip at the weather side of the pile body. However, prior attempts in this direction have been less than satisfactory. This is because the film, being flexible and supported only at one side by the pile body, tends to bend and curl away from the pile body after prolonged usage and exposure to the elements. Consequently, the film barrier no longer adequately performs its draft and moisture excluding functions.

Also, the prior weather stripping of this general type is fairly difficult to install as an add-on by the average home handyman which is quite undesirable in today's energy conscious atmosphere.

SUMMARY OF THE INVENTION

Accordingly, it is an object of the present invention to provide an improved weather seal of the type having a raised moisture and draft excluding fin at the side of the pile body.

Another object of the invention is to provide a weather strip having a raised fin in the form of a film secured adjacent the weather side of the pile body which does not curl or bend away from the pile body even after prolonged usage of the weatherstrip.

Still another object of the invention is to provide such a weatherstrip which is relatively easy and inexpensive to make.

A further object of the invention is to provide a fin-type weather strip which can be installed around windows, doors, skylights and other closures by the average homeowner.

A further object of the invention is to provide an improved method for making weather stripping having one or more of the above characteristics.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

In general, the present weather seal comprises the usual backing strip which supports an upstanding pile body composed of a multiplicity of densely packed flexible resilient fibers. The weather strip also includes a draft and moisture excluding fin. However, instead of forming the fin integrally with the backing strip or on the pile fibers as has been done heretofore, the fin is incorporated into the weather stripping at the same time that the weather stripping is being installed in a strip-supporting channel.

As the weather stripping is guided into the channel, a thin strip of flexible, resilient plastic film is positioned flush against one side of the pile body. The film is sufficiently wide that, with one edge of the film more or less even with the top of the pile body, the opposite edge margin of the film extends down and across a pile-free edge margin of the backing strip. The weather strip and film together are then guided into a channel being continuously roll-formed from ribbon stock drawn from a supply roll. As each incremental length of weather strip and film is positioned in the channel, the sides of the channel are clinched around the backing strip so that the film extending across the backing strip edge margin is tightly gripped by the channel.

That clinching operation deforms or bends the film right at the base of the pile body and the film, being resilient, tends to resume its normal unstressed flat condition. This causes the portion of the film projecting up out of the channel to be pressed tightly against the side of the pile body. Thus the film, being biased against the pile body as aforesaid, has little tendency to fall away from its upstanding erect condition so that it remains as an effective barrier against moisture and drafts even after prolonged usage of the weather strip. The channel also includes a lengthwise metal fin which can be secured by suitable fasteners to structure adjacent the closure to be sealed.

In use, the weather seal is simply positioned adjacent the closure such that the pile body and the upper edge of the film strip engage the closure with the film exposed to the weather or inward. Once the weather seal is properly positioned, fasteners are driven through the channel fin into the supporting structure. Thus the present weather seal can be installed quite easily by the average homeowner without requiring any special tools. Yet, because the present weather seal is relatively easy to manufacture as compared with prior comparable weather stripping employing impervious moisture and draft resisting barriers, it should cost less in the marketplace.

BRIEF DESCRIPTION OF THE DRAWING

For a fuller understanding of the nature and objects of the invention, reference should be had to the following detailed description taken in connection with the accompanying drawing, in which.

DESCRIPTION OF THE PREFERRED EMBODIMENT

Figure 2:
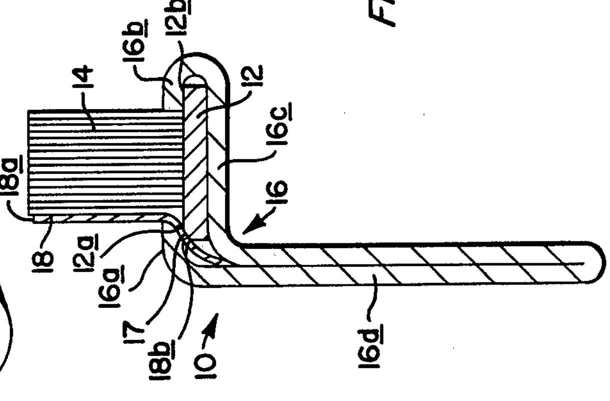
FIG. 2 is a sectional view along line 2—2 of FIG. 1.

Referring first to FIG. 2 of the drawing, my weather seal indicated generally at 10 comprises a backing strip 12 to which is attached an upstanding pile body 14 composed of a multiplicity of densely packed, flexible, resilient fibers. The backing strip 12 is secured in a channel indicated at 16 whose opposite side walls 16*a* and 16*b* clinch pile-free edge margins 12*a* and 12*b* of the backing strip 12 against the channel bottom wall 16*c*. Also positioned adjacent one edge of strip 12, say, edge 12*a*, is an upstanding impervious barrier 18 made of a flexible resilient film of plastic such as medium density polyethylene. The upper edge 18*a* of the film barrier is positioned just below the top of the pile body, while the lower edge margin 18*b* extends down to the base of the pile body and across the pile-free edge margin 12*a* of strip 12.

When the channel side wall 16*a* is clinched as aforesaid, the side wall presses the film barrier margin 18*b* tightly against the strip edge 12*a* at the base of the pile body. The film barrier is thus bent as illustrated in FIG. 2 more or less at a right angle. The film, being flexible and resilient, tends to resume its unstressed flat condition with the result that the film portion projecting above the channel wall 16*a* is biased against the side of the pile body. Therefore the barrier tends to remain in that upstanding erect position so that it forms an effective barrier to moisture and drafts at the side of the pile body. The channel 16 includes a lengthwise fin 16*d* extending down from bottom wall 16*c* to facilitate securing the weather seal to supporting structure adjacent the closure to be sealed.

To install the unit, one simply positions the fin 16*c* against the support structure so that the top of the pile body engages the face of the closure. The closure is thus able to swing toward or away from the weather seal or to slide relative to the weather seal as it is being opened and closed. The film barrier 18 remains biased against the pile body so that it provides an effective seal against moisture and drafts. The upper edge 18*a* of that barrier is located slightly below the ends of the pile fibers so that if the door is slid relative to the weather seal, the film barrier does not rub against the closure and create unwanted noise.

Figure 1:
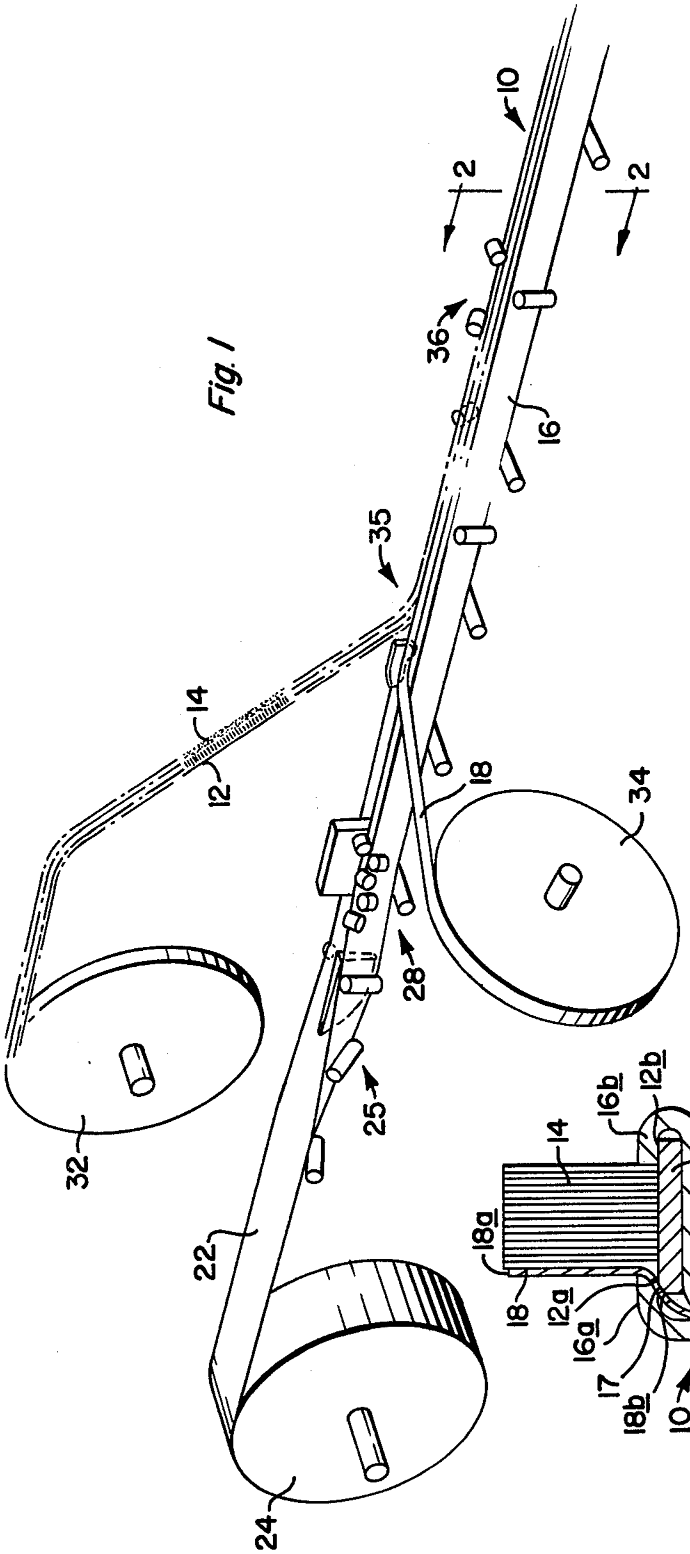
FIG. 1 is a diagrammatic view showing individual components being formed into a weather seal made in accordance with this invention.

Turning now to FIG. 1 of the drawings, the components of the weather seal 10 are assembled on a continuous production basis. More particularly, channel 16 is formed from a continuous metal strip 22 drawn from a roll 24. The strip is guided through a first work station 25 which roll-forms the strip into a more or less V shape and creates the beveled edge 16*d*. Thence the strip is conducted to a second station 28 containing more sets of rollers which further shape the strip to form the channel side walls 16*a*, 16*b* and the channel fin 16*c*.

The weather strip backing 12 and attached pile body 14 are drawn as a continuous length from a roll 32, while at the same time the film 18 is being drawn from a roll 34. Both the backing strip and the film are guided to a work station 35 where the backing strip is positioned between the channel walls 16*a* and 16*b* with the pile body 14 projecting up out of the channel. At the same time, the plastic film barrier 18 is laid in against the pile body 14 with its upper edge 18*a* positioned just below the tops of the pile fibers and its lower edge margin 18*b* being draped over the backing strip edge margin 12*a*. Finally, at a work station indicated at 36 the side walls 16*a* and 16*b* of the channel are clinched against the channel bottom wall 16*c* by rollers thereby gripping the backing strip edge margins 12*a* and 12*b* as well as the film margin 18*b* between those channel walls and completing the weather seal. Thereupon, the continuously formed weather seal 10 is cut into suitable lengths and stored or packaged.

Thus weather seal 10 can be formed with its impervious barrier 18 using existing roll-forming apparatus, the only add-on to existing equipment being the inclusion of a different type of guide for leading the film 18 into position against the pile body 14 just prior to clinching the channel walls 16*a* and 16*b*. Therefore, except for the cost of the film barrier 18, the overall cost of the weather seal 10 is no more than that of prior comparable weather stripping which does not have a raised fin at one or both sides of the pile body. In this connection, of course, a second film barrier similar to barrier 18 can be located against the opposite side of the pile body 14, the incorporation of that additional film barrier into the weather seal being accomplished in exactly the same way described above in connection with barrier 18.

It will thus be seen that the objects set forth above, among those made apparent from the preceding description are efficiently attained, and since certain changes may be made in the above construction without departing from the scope of the invention, it is intended that all matter contained in the above description or shown in the accompanying drawing be interpreted as illustrative and not in a limiting sense.

It is also to be understood that the following claims are intended to cover all of the generic and specific features of the invention herein described.

I claim:

1. A weather seal comprising

A. a backing strip,

B. a pile body projecting up from one face of the backing strip,

C. a flexible resilient film barrier positioned against at least one side of the pile body, the upper edge of the barrier being more or less even with the top of the pile body, the lower edge margin of the film extending down to the base of the pile body and across an edge margin of the backing strip, and D. a channel engaged around the backing strip, said channel having a pair of side walls which overlie the opposite edge margins of the backing strip and a bottom wall engaging under that strip, said channel side walls being clinched against the channel bottom wall so that the backing strip and barrier lower edge margin are gripped tightly, with the barrier being bent adjacent the base of the pile body but tending to resume its normal unstressed flat condition, so that the barrier portion extending out of the channel is biased against the pile body so that it remains in an upstanding erect position adjacent that body.

2. The weather seal defined in claim 1 wherein the edge of the channel side wall adjacent the barrier is beveled where it engages the barrier.

3. The weather seal defined in claim 1 wherein said channel includes a longitudinal mounting fin projecting from its bottom wall.

4. The weather seal defined in claim 1 wherein the edge margins of the backing strip are free of pile.

5. A weather seal comprising

A. a channel having a bottom wall and a pair of spaced-apart side walls,

B. a weather strip including a backing strip and an upstanding pile body, said weather strip being positioned in the channel with its side edges disposed between the channel side walls and the channel bottom wall and with its pile body projecting up out of the channel, and C. a resilient film barrier positioned flush against one side of the pile body, the upper edge of said film barrier being more or less even with the top of the pile body, the lower edge margin of the film barrier extending down to the base of the pile body and across the adjacent side edge margin of the weather strip, the channel side walls being clinched against the channel bottom wall so as to grip the weather strip between them and so as to bend the film barrier adjacent the base of the pile body whereby, because of its resilience, the barrier tends to resume its unstressed flat condition so that the portion of the film barrier projecting out of the channel is biased against the pile body so that it remains in an upstanding erect position against that body.

6. The method of making a weather seal comprising the steps of

A. continuously roll-forming a channel having a pair of spaced-apart side walls and a bottom wall, B. continuously guiding weather stripping composed of a backing strip and a pile body projecting from the backing strip into the channel so that the side edge margins of the backing strip are positioned between the side and bottom walls of the channel, C. continuously guiding a resilient film barrier into position against one side of the pile body so that the upper edge of the barrier is located more or less even with the top of the pile body and the lower edge margin of the barrier extends down to and across the adjacent side edge margin of the backing strip, and D. continuously clinching the side walls of the channel against the channel bottom wall so as to grip the weather strip between those walls and so as to bend the film barrier adjacent the base of the pile body so that the resilience of the barrier tends to bias the portion of the barrier projecting out of the channel against the pile body so that it remains in an upstanding erect position against that body.

* * * * *

UNITED STATES PATENT AND TRADEMARK OFFICE

CERTIFICATE OF CORRECTION

PATENT NO. : 4,198,453

DATED : April 15, 1980

INVENTOR(S) : Harold G. Olson

It is certified that error appears in the above-identified patent and that said Letters Patent are hereby corrected as shown below:

Col. 3, line 28, after "angle.", insert --If desired, the edge of the channel wall 16a adjacent the film barrier may be beveled as shown at 17 in FIG. 2 to eliminate any possibility of cutting the film when the channel walls are clinched.--

Col. 3, line 39, change "16c" to --16d--.

Col. 3, line 57, change "16d" to --17--.

Col. 3, line 60, change "16c" to --16d--.

Signed and Sealed this

*First* Day of *July 1980*

[SEAL]

*Attest:*

SIDNEY A. DIAMOND

*Attesting Officer* *Commissioner of Patents and Trademarks*